US010649157B2

(12) United States Patent
Cao et al.

(10) Patent No.: US 10,649,157 B2
(45) Date of Patent: May 12, 2020

(54) FREEFORM DIFFRACTIVE OPTICAL ELEMENT (DOE) FOR USE IN AN OPTICAL TRANSMITTER AND METHOD OF DESIGNING AND MANUFACTURING THE FREEFORM DOE

(71) Applicant: Foxconn Interconnect Technology Limited, Grand Cayman (KY)

(72) Inventors: Dongqing Cao, San Jose, CA (US); Ye Chen, San Jose, CA (US); Bing Shao, San Jose, CA (US); Andrew Schmit, Sunnyvale, CA (US); Li Ding, Pleasanton, CA (US)

(73) Assignee: Foxconn Interconnect Technology Limited, Grand Cayman (KY)

( * ) Notice: Subject to any disclaimer, the term of this patent is extended or adjusted under 35 U.S.C. 154(b) by 0 days.

(21) Appl. No.: 16/104,351

(22) Filed: Aug. 17, 2018

(65) Prior Publication Data
US 2020/0057213 A1    Feb. 20, 2020

(51) Int. Cl.
*G02B 6/42* (2006.01)
*G05B 19/418* (2006.01)
*B29K 63/00* (2006.01)
*B29D 11/00* (2006.01)

(52) U.S. Cl.
CPC ..... *G02B 6/4207* (2013.01); *G05B 19/41885* (2013.01); *B29D 11/00663* (2013.01); *B29K 2063/00* (2013.01); *G05B 2219/33189* (2013.01); *G05B 2219/37278* (2013.01)

(58) Field of Classification Search
None
See application file for complete search history.

(56) References Cited

U.S. PATENT DOCUMENTS

| 7,889,426 | B2 | 2/2011 | Takeuchi et al. |
| 8,019,233 | B2 | 9/2011 | Chen et al. |
| 9,841,571 | B1 | 12/2017 | Momtahan |
| 2007/0229930 | A1 | 10/2007 | Sato et al. |
| 2008/0273167 | A1 | 11/2008 | Clarke |

FOREIGN PATENT DOCUMENTS

| JP | H07174914 | 7/1995 |
| JP | 2005307173 | 11/2005 |
| JP | 2007261004 | 10/2007 |
| WO | 9513910 | 5/1995 |

*Primary Examiner* — Jerry Rahll
(74) *Attorney, Agent, or Firm* — Thomas Horstemeyer, LLP

(57) ABSTRACT

A freeform DOE for use in an optical transmitter and a method of designing and manufacturing the DOE are provided. The freeform DOE is capable of achieving the same, or nearly the same, functionality as that of a glass DOE, but has a design that has been transformed to make the surface profile of the DOE compatible with a molding process that can be used to manufacture the DOE with high quality at low costs. The method of designing and manufacturing the DOE includes preselecting a CGH that will obtain a target freeform DOE design, using a preselected smoothing function to smooth the surface profile of the target freeform DOE design to transform the design into a DOE design that is compatible with a molding process, and using a fabrication process to manufacture a freeform DOE that is based on the transformed DOE design.

18 Claims, 11 Drawing Sheets

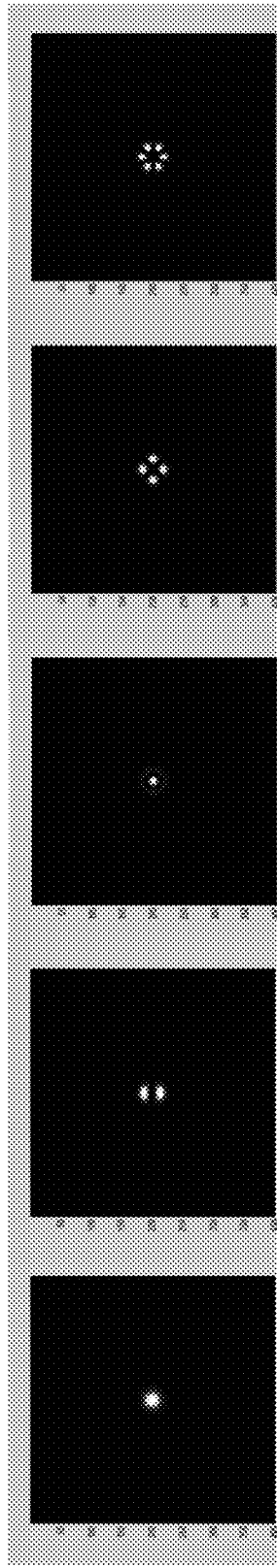
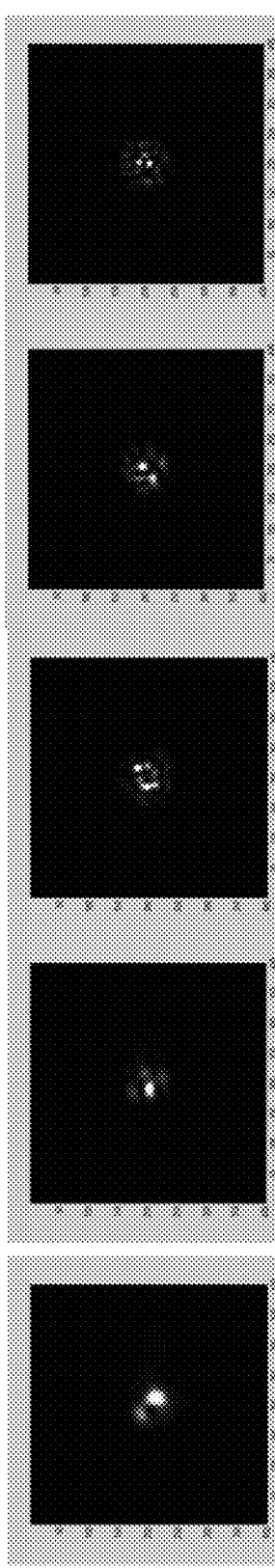
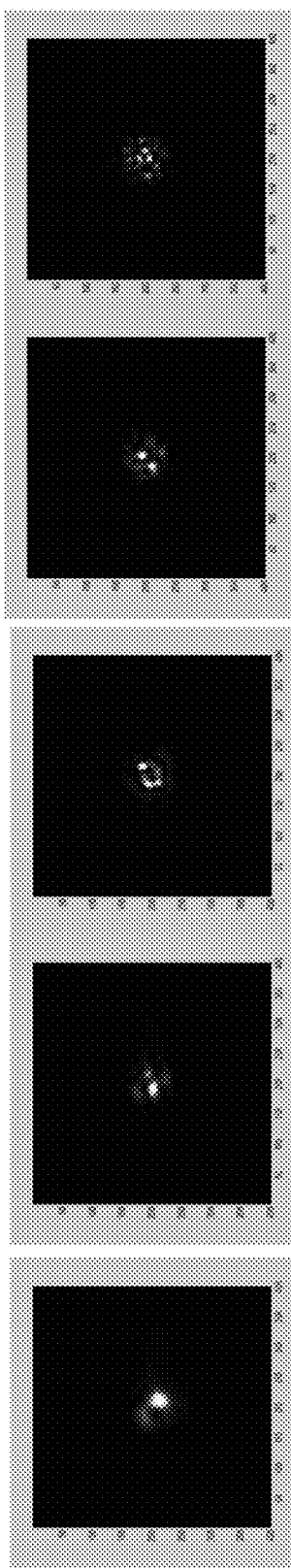

FREEFORM DIFFRACTIVE OPTICAL ELEMENT (DOE) FOR USE IN AN OPTICAL TRANSMITTER AND METHOD OF DESIGNING AND MANUFACTURING THE FREEFORM DOE

TECHNICAL FIELD OF THE INVENTION

The invention relates to optical transmitters and transceivers used in optical communications networks to transmit optical signals over optical fibers or optical waveguides. More particularly, the invention relates to a freeform diffractive optical element (DOE) of an optical coupling system of an optical transmitter or transceiver.

BACKGROUND OF THE INVENTION

In optical communications networks, optical transceiver modules are used to transmit and receive optical signals over optical fibers. A transceiver module generates amplitude and/or phase and/or polarization modulated optical signals that represent data, which are then transmitted over an optical fiber coupled to the transceiver. The transceiver module includes a transmitter side and a receiver side. On the transmitter side, a laser light source generates laser light and an optical coupling system receives the laser light and optically couples, or images, the light onto an end of an optical fiber. The laser light source typically comprises one or more laser diodes that generate light of a particular wavelength or wavelength range. The optical coupling system typically includes one or more reflective elements, one or more refractive elements and/or one or more diffractive elements.

In high-speed data communications networks (e.g., 10 Gigabits per second (Gb/s) and higher), multimode optical fibers are often used. In such networks, certain link performance characteristics, such as the link transmission distance, for example, are dependent on properties of the laser light source and on the design of the optical coupling system. Among the most dominant ones are the modal bandwidth of the fiber and the relative intensity noise (RIN) of the laser light source, which can be degraded by the optical back-reflection to the laser light source. Both of these parameters can be affected by the launch conditions of the laser light into the end of the multimode optical fiber.

The effective modal bandwidth of multimode fiber is dependent in part upon the launch conditions of the laser light into the end of the fiber. The launch conditions are, in turn, dependent upon the properties of the laser diode itself and upon the optical coupling system design and configuration. However, due to limitations on the manufacturability of optical elements that are typically used in imaging-type optical coupling systems, control of the launch conditions is limited primarily to designing and configuring the optical coupling system to control the manner in which it images the light from the laser source onto the end of the fiber. Other types of non-imaging optical coupling system designs exist, such as spiral launch designs, for example, that overcome certain disadvantages of the imaging-type optical coupling systems. Such non-imaging systems, however, also have shortcomings.

Vertical Cavity Surface Emitting Laser Diodes (VCSEL)-based multimode optical communication systems have been considered low cost solutions due to the relative ease of optical coupling system designs. However, the increasing data rate of optical communication requires better noise control in the transmission link. Noise types include back reflection, RIN, mode partitioning noise (MPN), mode selective noise (MSN), etc. Back reflection from the optical surfaces of the optical coupling system destabilizes the VCSEL and increases the RIN. By adding perturbation to the perfect optical surfaces, back reflection can be mitigated. For example, U.S. Pat. No. 9,841,571 (hereinafter referred to as "the '571 patent"), which issued on Dec. 12, 2017 and which is owned by the assignee of the present application, discloses such perturbations and their effects. DOEs created using computer generated holograms (CGHs) can also be used to suppress optical feedback, in a more controlled and systematic manner. For example, U.S. Pat. No. 8,019,233 (hereinafter referred to as "the '233 patent"), which issued on Sep. 13, 2011 and which is hereby incorporated by reference herein in its entirety, discloses selecting a CGH that will achieve one or more a target launch conditions and creating a DOE that implements the CGH. Such DOEs can be used to suppress optical feedback.

There is a constant exchange of power between VCSEL modes and such exchanges can become the source of modal noise. When mode selectivity occurs in the optical coupling system, the coupled power will fluctuate, generating MSN. To overcome or reduce this noise source, the focus patterns generated by each VCSEL mode should overlap as much as possible spatially and the fiber modes excited should overlap as well so that mode selectivity is minimized at the connector joint. This effect can best be achieved by using a DOE designed to achieve this effect, as disclosed in the '233 patent.

MPN also surfaces through the combination of mode power exchange and the fiber modal dispersion. With a 50-micrometer (μm) graded index multimode fiber, VCSEL modes are typically coupled into the different fiber mode groups, which travel at different speeds in the fiber causing modal dispersion. When the power exchanges between VCSEL modes, MPN appears on the transmitted signals at any given time due to the time separation of fiber modes. To reduce this noise effect, the VCSEL modes should be mapped into the same fiber mode groups as evenly as possible so that at any given time, the transmitted signal contains all of the VCSEL mode content. Again this can only be best achieved by using a CGH to create a DOE.

DOEs that are designed to implement a selected CGH can be made in many different ways. A binary optics-based DOE made through a lithographic process is the most widely used DOE. The DOE is typically made on a glass substrate and the packaging of the DOE is a relatively complex design compared to plastic optics, which are often made using an injection molding process and can incorporate necessary mechanical features. DOEs are sometimes made of plastic, but plastic DOEs are not capable of achieving the same, or nearly the same, functionality as that of glass DOEs due to the inability to form the complex features of the diffractive pattern in plastic using current plastic fabrication techniques (i.e., injection molding and replication from a master mold). Such DOEs are typically either a Fresnel lens type of device having radially symmetric features or of the type having simple analytically describable surface molded in low temperature materials. It is difficult to replicate the features from a glass DOE used in transceiver design in injection molding, as the plastic material used for fiber optics applications is typically high temperature material, such as Ultem polyetherimide (PEI), A need exists for a method of forming a plastic DOE that is capable of achieving the same, or nearly the same, functionality as that of a glass DOE in high temperature materials.

BRIEF DESCRIPTION OF THE DRAWINGS

FIGS. 8A-8E show a simulated intensity distribution pattern for a VCSEL light beam coupled by a conventional optical coupling system onto an end face of an optical fiber for VCSEL modes LP01, LP11, LP02, LP21 and LP31, respectively.

FIGS. 9A-9E show a simulated intensity distribution pattern for a VCSEL light beam coupled by a transformed DOE design in accordance with the inventive principles and concepts onto an end face of an optical fiber for VCSEL modes LP01, LP11, LP02, LP21 and LP31, respectively.

FIGS. 10A-10E show a simulated intensity distribution pattern for a VCSEL light beam coupled by a plastic injection-molded DOE in accordance with the inventive principles and concepts onto an end face of an optical fiber for VCSEL modes LP01, LP11, LP02, LP21 and LP31, respectively.

DETAILED DESCRIPTION OF AN ILLUSTRATIVE EMBODIMENT

Figure 1:
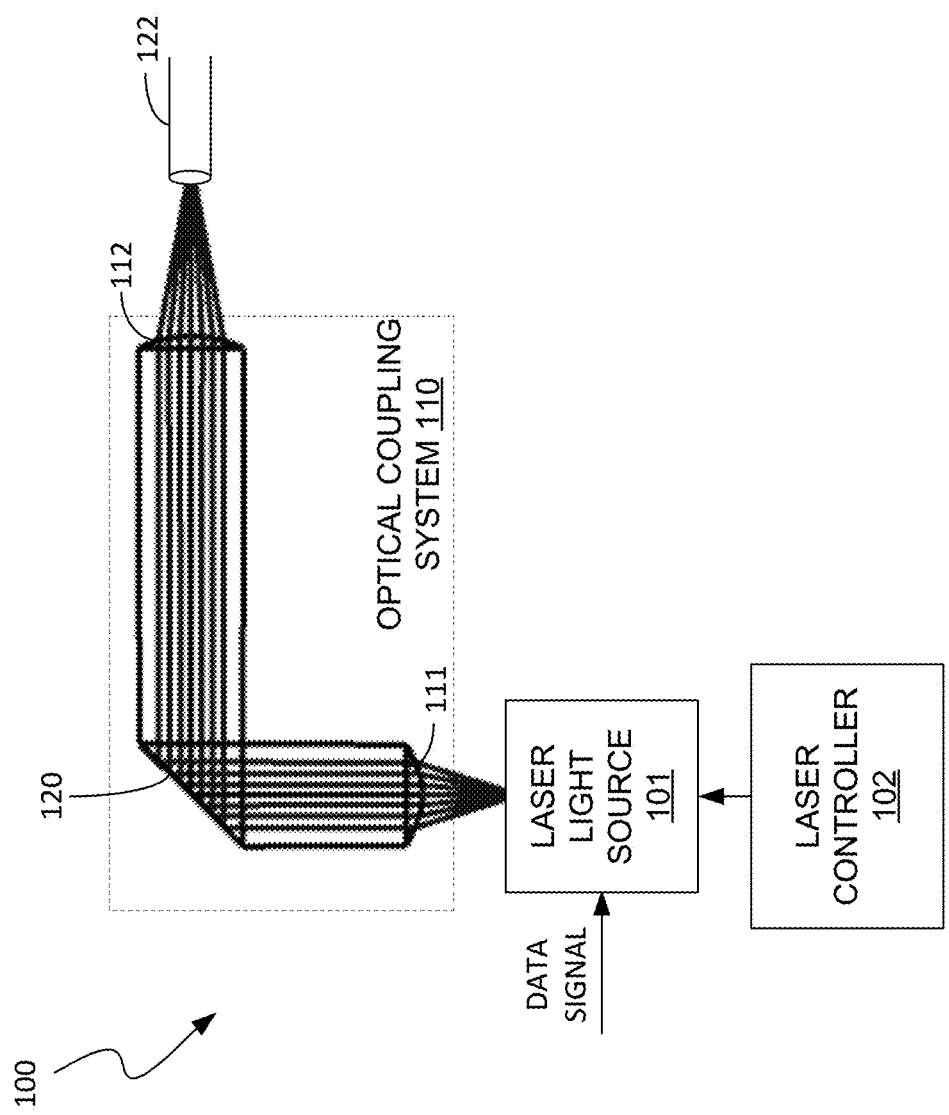
FIG. 1 illustrates a block diagram of an optical transmitter having an optical coupling system in which a freeform DOE is incorporated in accordance with a representative embodiment.

In accordance with the invention, a freeform DOE for use in an optical transmitter or transceiver is provided that is capable of achieving the same, or nearly the same, functionality as that of a glass DOE, but has a design that has been transformed to make the DOE features compatible with a low-cost fabrication process (e.g., injection molding). Making the freeform DOE features compatible with a low-cost fabrication process enables the freeform DOE to be mass produced at relatively low costs with high quality. The method of designing and manufacturing the DOE includes preselecting a CGH that will obtain a target freeform DOE design, using a preselected smoothing function to smooth the surface profile of the target freeform DOE design to transform the design into a DOE design that is compatible with a preselected fabrication process, and using the preselected fabrication process to manufacture a freeform DOE based on the transformed DOE design.

In the following detailed description, for purposes of explanation and not limitation, example embodiments disclosing specific details are set forth in order to provide a thorough understanding of an embodiment according to the present teachings. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

Exemplary, or representative, embodiments will now be described with reference to the figures, in which like reference numerals represent like components, elements or features. It should be noted that features, elements or components in the figures are not intended to be drawn to scale, emphasis being placed instead on demonstrating inventive principles and concepts.

FIG. 1 illustrates a block diagram of an optical transmitter 100 having an optical coupling system 110 in which a freeform DOE 120 is incorporated in accordance with an embodiment. For illustrative purposes, the optical coupling system 110 is shown as also having first and second refractive lenses 111 and 112, respectively. The freeform DOE 120 can be disposed on a refractive surface or on a reflective surface. In the representative embodiment shown in FIG. 1, the plastic freeform DOE 120 is disposed on a reflective surface that folds the optical pathway by 90°. The optical transmitter 100 is typically part of an optical transceiver module (not shown) that includes an optical receiver (not shown). The term "optical transmitter," as that term is used herein, is intended to mean a transmitter or transceiver having components for generating an optical signal for transmission over an optical waveguide, such as an optical fiber.

The optical transmitter 100 includes a light source 101 that is modulated by an electrical data signal to produce an optical data signal. In accordance with a representative embodiment, the light source 101 is a laser and will be referred to hereinafter as the laser light source 101. A laser controller 102 controls the bias current of the laser light source 101, which may be a VCSEL. The transmitter 100 typically includes monitoring circuitry (not shown) that monitors the output power level of the laser light source 101 and produces a feedback signal that is fed back to the laser controller 102. The laser controller 102 controls the bias current of the laser light source 101 based on the feedback signal. For ease of illustration, the components of the transmitter 100 that monitor the output power of the laser light source 101 and generate the feedback signal that is used by the laser controller 102 to control the laser light source 101 are not shown in FIG. 1.

The laser light that is produced by the laser light source 101 is received by the optical coupling system 110 and coupled by the optical coupling system 110 into the end of an optical fiber 122. The freeform DOE 120 is designed in accordance with the method described briefly above, which will be described below in more detail with reference to FIG. 3. The lens 111 is a collimating lens that collimates the diverging laser light into a collimated light beam, which is directed onto the freeform DOE 120. The freeform DOE 120 provides the desired launch control over the laser light and directs the light toward the lens 112, which is a focusing lens that focuses the light onto the end face of the fiber 122. The lenses 111 and 112 are optional. If included, the lenses 111 and 112 and the freeform DOE 120 may be separate parts or they may be integrally formed in a single substrate material. The freeform DOE 120 produces and determines the preselected intensity distribution pattern to be formed on the end face of the optical fiber 122. As will be discussed in more detail below, the preselected intensity distribution pattern is preselected to achieve at least one of the aforementioned goals: reduced back reflection, reduced RIN, reduced MPN, and reduced MSN. Ideally, the preselected intensity distribution pattern is capable of achieving all of these goals.

Figure 2:
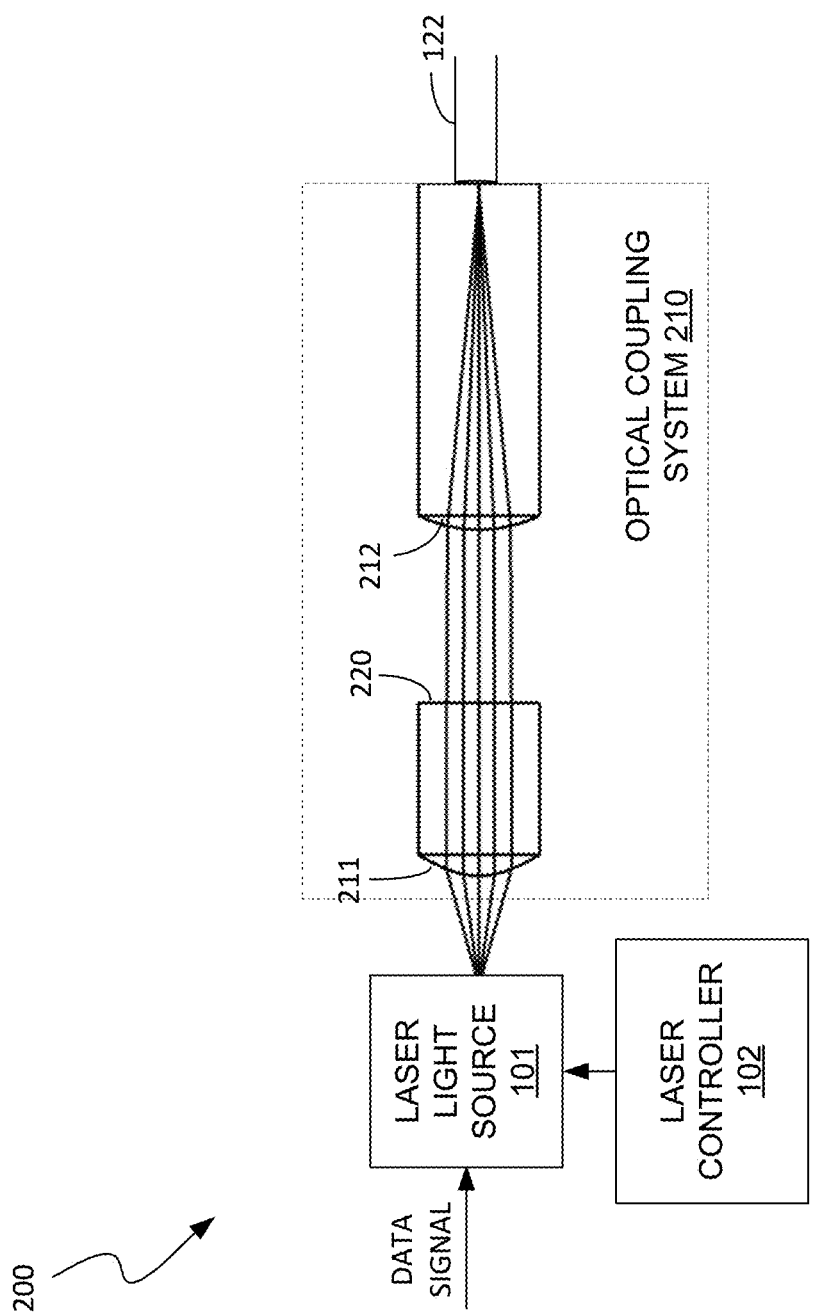
FIG. 2 illustrates a block diagram of an optical transmitter having an optical coupling system that incorporates a freeform DOE formed on a refractive surface in accordance with another representative embodiment.

FIG. 2 illustrates a block diagram of an optical transmitter 200 having an optical coupling system 210 that incorporates a freeform DOE 220 formed on a refractive surface in accordance with another representative embodiment. For illustrative purposes, the optical coupling system 210 is shown as also having first and second refractive lenses 211 and 212, respectively. The optical transmitter 200 is typically part of an optical transceiver module (not shown) that includes an optical receiver (not shown).

The laser light that is produced by the laser light source 101 is received by the optical coupling system 210 and coupled by the optical coupling system 210 onto the end face of the optical fiber 122. The freeform DOE 220 is designed in accordance with the method described below with reference to FIG. 3. The lens 211 is a collimating lens that collimates the diverging laser light and directs the light onto the freeform DOE 220. The freeform DOE 220 provides the desired launch control over the laser light and directs the light toward the lens 212, which is a focusing lens that focuses the light onto the end face of the fiber 122. The lenses 211 and 212 are optional. If included in the optical coupling system 210, the lenses 211 and 212 and the DOE 220 may be separate parts or they may be integrally formed in a single substrate material with the freeform DOE 220. The freeform DOE 220 produces and determines the preselected intensity distribution pattern to be formed on the end face of the optical fiber 122. The preselected intensity distribution pattern is preselected to achieve at least one of the aforementioned goals: reduced back reflection, reduced RIN, reduced MPN, and reduced MSN.

Figure 3:
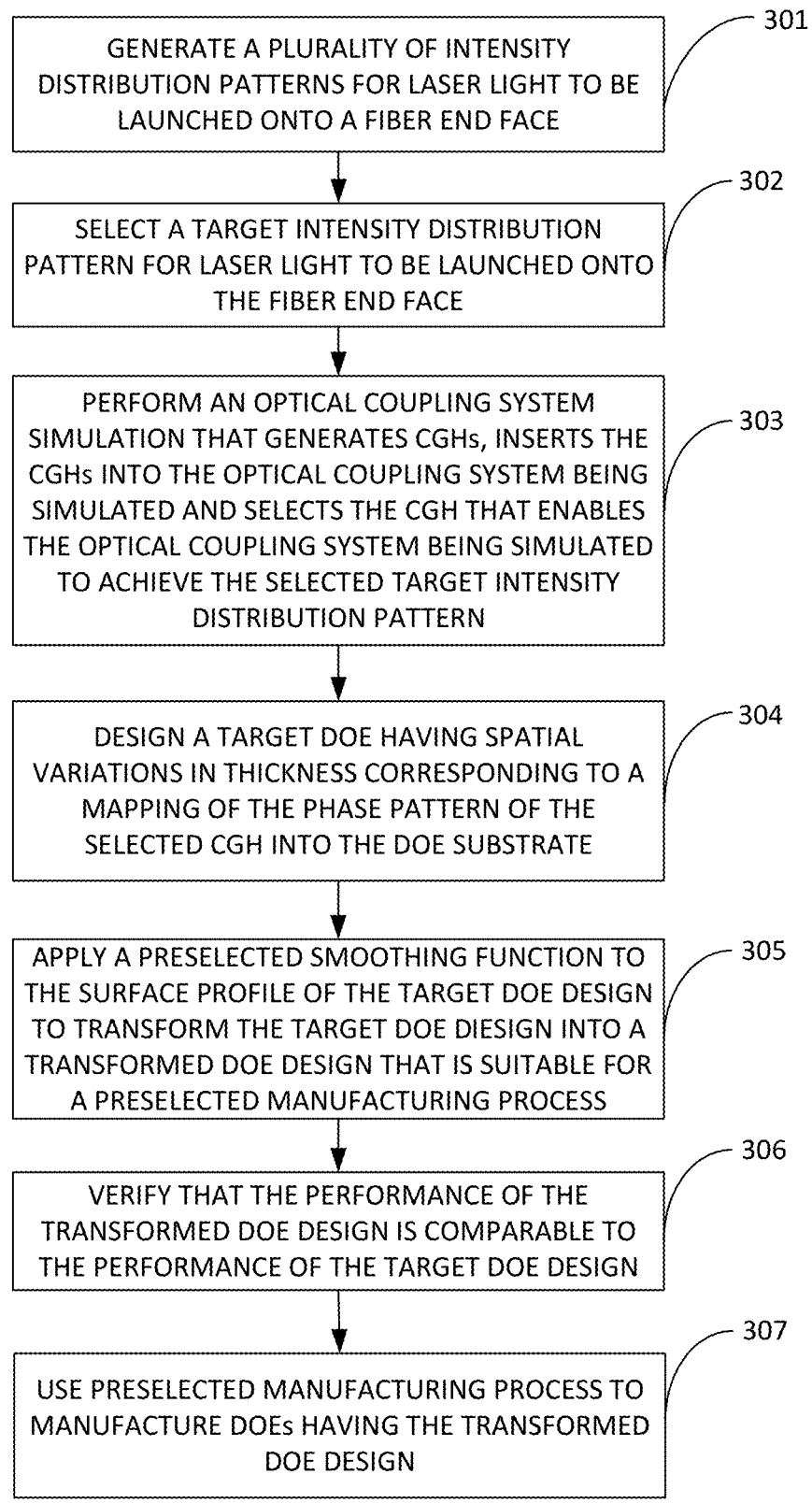
FIG. 3 illustrates a flowchart that represents a method in accordance with a representative embodiment for designing and manufacturing a freeform DOE.

FIG. 3 is a flow diagram representing the method in accordance with a representative embodiment of the inventive principles and concepts for designing and manufacturing the freeform DOE. Blocks 301-303 represent one or more simulation algorithm(s) used to simulate an optical coupling system of an optical transmitter as it launches light onto an end face of an optical fiber. The steps represented by blocks 301-303 may be separate algorithms or separate portions of a single algorithm. The algorithm(s) generates intensity distribution patterns, as indicated by block 301, and selects one of the generated intensity distribution patterns based on its effectiveness at performing one of the aforementioned counter measures to achieve one of the aforementioned goals, as indicated by block 302 (e.g., optimizing coupling and alignment tolerances, mapping each VCSEL mode into a spatially overlapping distribution, optimizing the mode balance by mapping each VCSEL mode into the overlapping fiber mode composition, minimizing the back reflection, etc.). Once the intensity distribution pattern has been selected, the algorithm(s) uses the selected intensity distribution pattern as input and performs an optical coupling system simulation that generates CGHs, inserts each CGH into the simulated optical coupling system, and selects the CGH that results in the simulated optical coupling system achieving the selected intensity distribution pattern, as indicated by block 303.

Once the CGH has been selected, a target DOE design is created that has spatial variations in the thickness and/or index of refraction corresponding to a mapping of the phase pattern of the selected CGH into a DOE substrate of the type that is typically used to create DOEs (e.g., a glass substrate), as indicated by block 304. The target DOE design is applicable to both refractive and reflective surfaces. A preselected smoothing function is then applied to the surface profile comprising the diffractive pattern of the DOE to transform the DOE design into a DOE design that is suitable for low-cost, high-quality manufacturing of the DOE (e.g., a plastic DOE made via injection molding), as indicated by block 305. The transformed DOE design is then validated or verified by comparing its performance to the performance of the target DOE design, as indicated by block 306. If the transformed DOE design has performance comparable to that of the target DOE design, then the transformed DOE design is manufactured using a low-cost, high-quality manufacturing process such as injection molding, thermal compression molding and epoxy replication, for example, as indicated by block 307. This typically involves creating a mold of the transformed DOE design from which DOEs can be mass produced via the fabrication process and using the fabrication process to fabricate the DOEs. Prior to mass producing a large number of the DOEs, a small number (e.g., one) of the DOEs are typically produced and tested to verify that the performance of the manufactured DOE is comparable to the performance of the transformed DOE design. This latter verification step and the verification step represented by block 306 are optional, but preferred to avoid manufacturing DOEs that do not meet performance criteria.

The method represented by the flow diagram shown in FIG. 3 may include additional steps not shown in FIG. 3, such as the step of verifying that the manufactured DOE referred to in block 307 has comparable performance to the transformed DOE design referred to in 305 and 306. The method represented by the flow diagram of FIG. 3 may have fewer steps than what is shown in FIG. 3. For example, if there is high confidence that the transformed DOE design will meet performance requirements, the verification step represented by block 306 may be eliminated. Also, at least portions of the steps represented by blocks 301-303 can be performed manually instead of automatically. For example, a person involved in the process of designing the freeform DOE may run simulations to determine which of a plurality of intensity distribution patterns achieves a desired reduction in back reflection and then select a CGH that results in that intensity distribution pattern.

Figure 4:
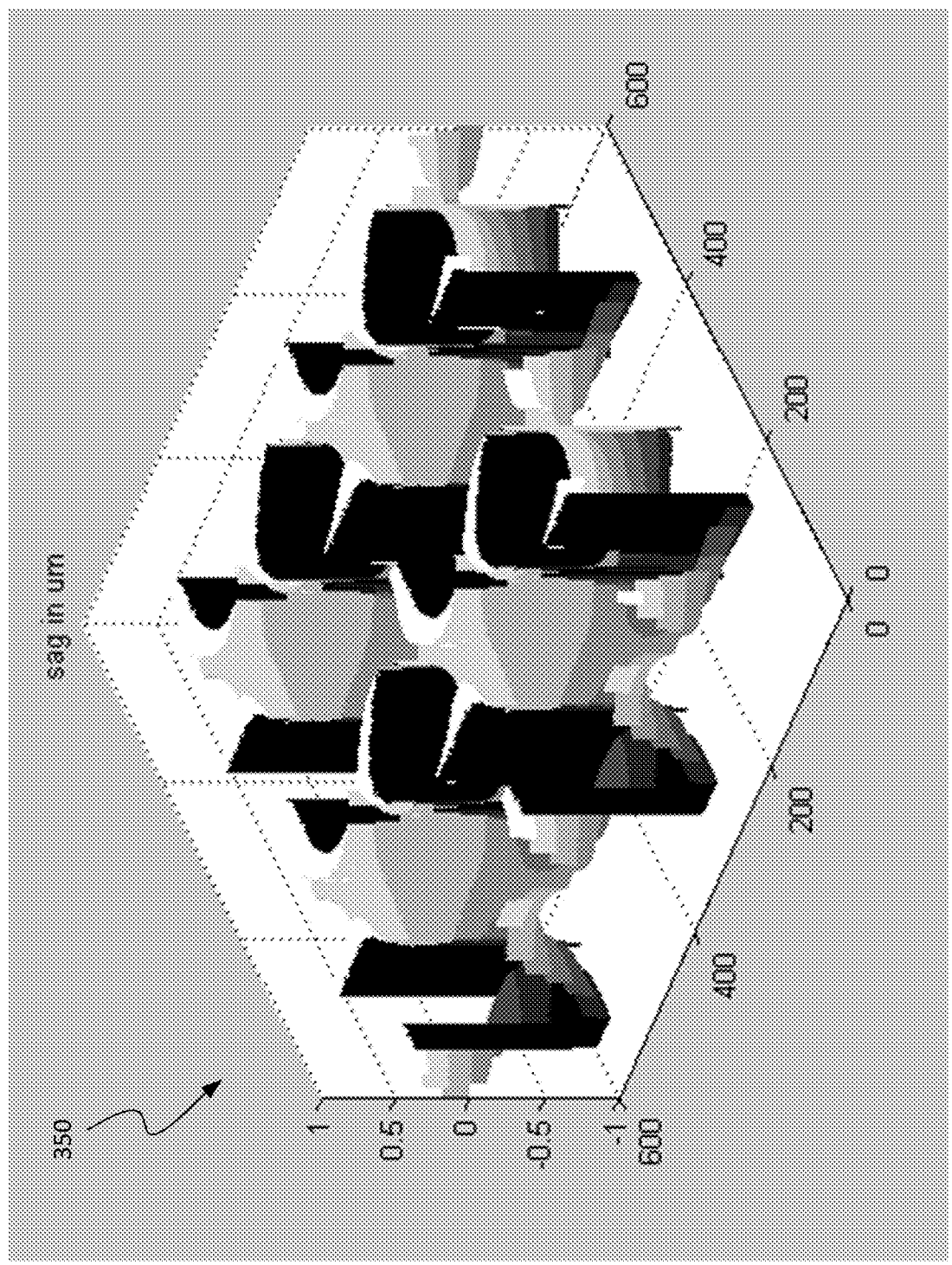
FIG. 4 is a graphical illustration of the sagitta (sag) of an eight-level CGH surface profile in micrometers (microns).
Figure 5:
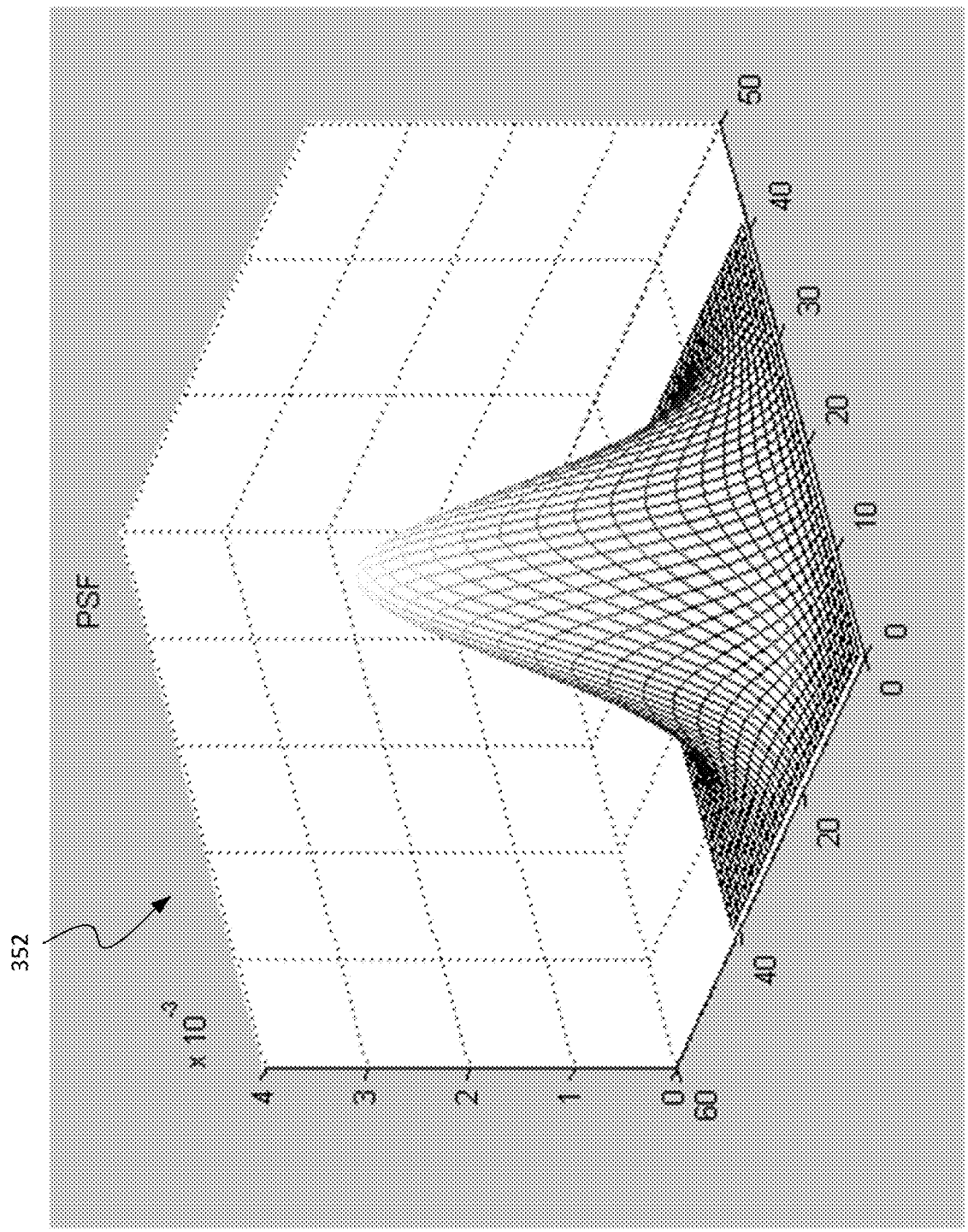
FIG. 5 graphically illustrates a smoothing function that may be applied to a CGH surface profile, such as the CGH surface profile shown in FIG. 4, for example, to transform the CGH surface profile into a transformed DOE profile.
Figure 6:
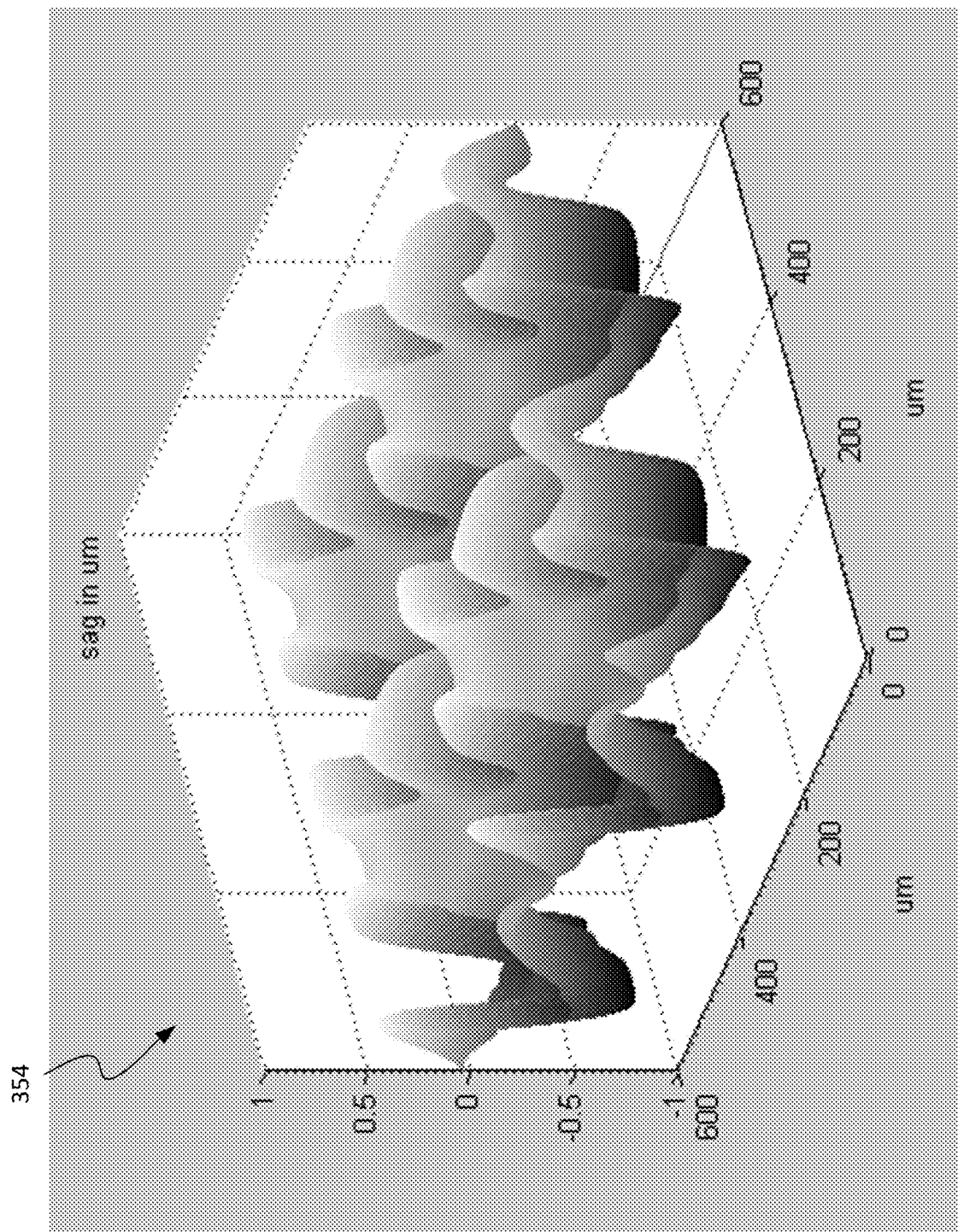
FIG. 6 is a surface profile of a transformed DOE design produced by applying the smoothing function shown in FIG. 5 to the CGH surface profile shown in FIG. 4.
Figure 7:
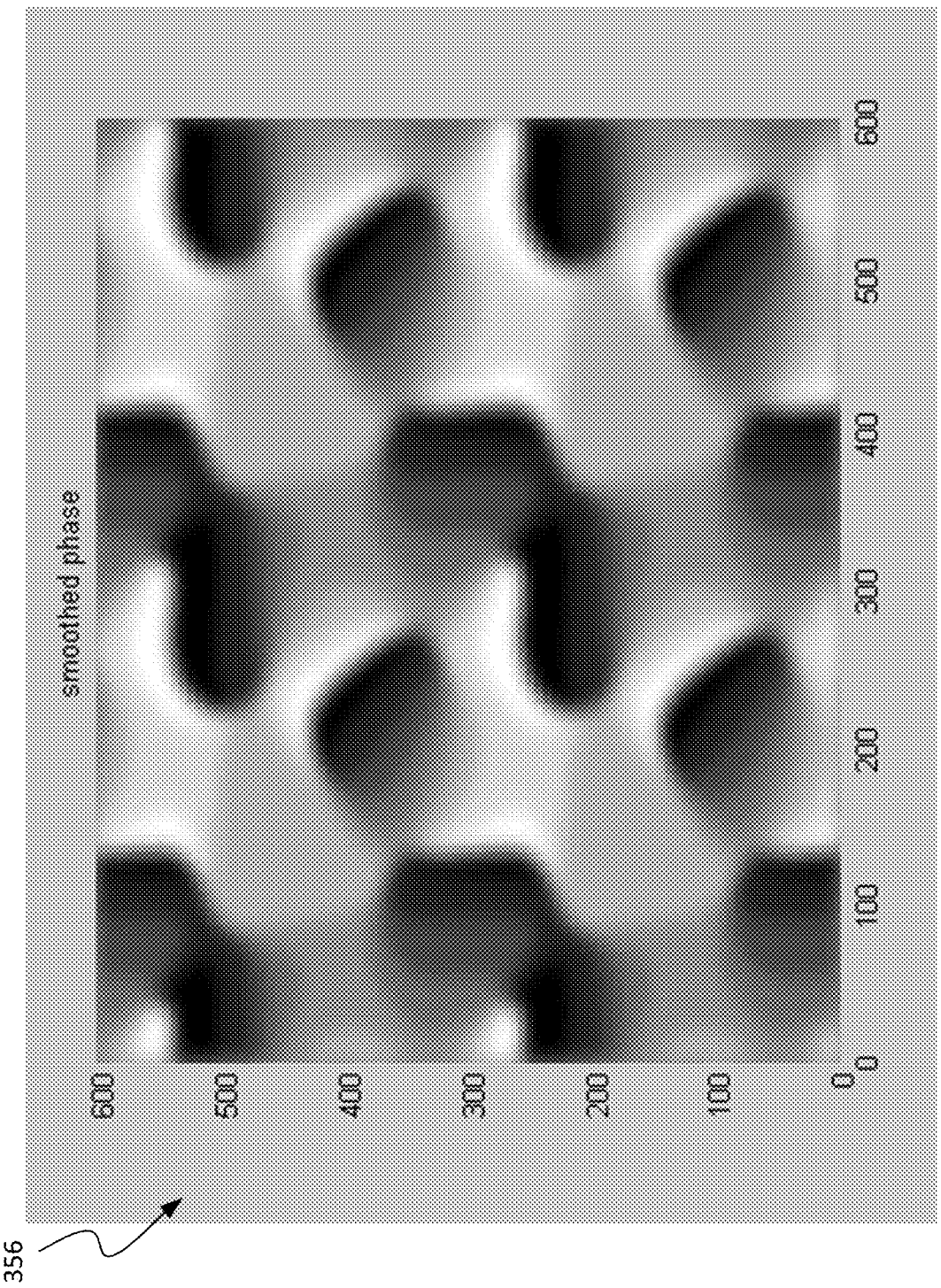
FIG. 7 shows the phase profile of the transformed DOE design having the surface profile shown in FIG. 6.

FIG. 4 is a graphical illustration of the sagitta (sag) of an eight-level CGH surface profile 350 in micrometers (microns). For demonstrative purposes, it is assumed that the CGH surface profile 350 corresponds to the surface profile of the target DOE design referred to in block 304 of FIG. 3. FIG. 5 graphically illustrates a smoothing function 352, which, for demonstrative purposes, is assumed to be the preselected smoothing function referred to in block 305 of FIG. 3. FIG. 6 is a surface profile 354 of the transformed DOE design obtained at block 305 of FIG. 3. In accordance with a representative embodiment, the smoothing function shown in FIG. 5 is a point spread function, which is convolved with the CGH surface profile 350 shown in FIG. 4. FIG. 7 shows the phase profile 356 of the transformed DOE design corresponding to the surface profile 354 shown in FIG. 6.

It can be seen from a comparison of the surface profiles 350 and 354 that the surface profile 354 of the transformed DOE design is a smoother, more continuous profile than the profile 350. A plastic DOE having this smoother, more continuous surface profile 354 is better suited than a DOE having the surface profile 350 for reproduction by injection molding. The smooth level of DOE profile can be controlled by the size of the point spread function such as that shown in FIG. 5. By optimizing the point spread function size, the fabricated DOE having the surface profile 354 will retain most or all of the important functionality of the target DOE design referenced in block 304 of FIG. 3.

It should be noted that the conventional or known approach to generating a plastic DOE does not include a step of transforming the target DOE design into a transformed DOE design that is compatible with a particular fabrication process that is suitable for fabricating a plastic DOE. Rather, the prior art approach for generating a plastic DOE involves generating a target (e.g., glass) DOE design, creating a mold that is based on the target DOE design, and then using the mold to replicate a plastic DOE. The main problem with this approach is that the plastic DOE made in this manner loses many of the important fine features of the target DOE design and therefore does not perform the aforementioned counter measures well to achieve the desired functionality. Additionally, the known approach does not involve using a CGH to produce the DOE design, and therefore the resulting DOE design has limited functionality. Also, the known rotationally symmetric DOEs made using the known approach are not capable of reducing back reflection or performing mode selection.

It should also be noted that fabricated DOE in accordance with the inventive principles and concepts is a freeform DOE. The term "freeform DOE," as that term is used herein, denotes a DOE having a surface profile that is rotationally asymmetric relative to an optical axis of the DOE. The optical axis of the freeform DOE is an axis that is substantially normal to a plane on which the DOE design is based. The transformed DOE design in accordance with the inventive principles and concepts will usually have optimized functionality, such a specific mode selection and/or lower back reflection, for example. In contrast, the known rotationally symmetric diffractive lenses usually refer to Fresnel-type lenses, which usually do not have the functionality described herein. Plastic DOEs commonly manufactured by replication or by press molding are rotationally symmetric.

In accordance with a representative embodiment of the inventive principles and concepts, the manufacturing process referred to at block 307 of FIG. 3 is an injection molding process. Injection molding processes can be used to produce plastic molded freeform DOEs very precisely at relatively low costs. The mold master that is used to make the molds that are used for this purpose may be made using known techniques, such as freeform diamond turning, for example. The mold master matches up precisely with the transformed DOE design. For example, a four- or five-axis diamond turning machine can be used to create the profile molder that is then used to injection mold the plastic DOE. This ensures that the plastic molded DOE has comparable performance to that of the transformed DOE design.

FIGS. 8A-8E show a simulated intensity distribution pattern for a VCSEL light beam coupled by a conventional refractive optical element onto an end face of an optical fiber for VCSEL linearly polarized (LP) modes LP01, LP11, LP02, LP21 and LP31, respectively. Although VCSELs typically have a single longitudinal mode, they typically have multiple LP modes, such as LP01, LP11, etc., which have slightly different wavelengths. Multimode optical fibers have multiple LP modes as well. FIGS. 9A-9E show a simulated intensity distribution pattern for a VCSEL light beam coupled by a transformed DOE design (block 305 of FIG. 3) in accordance with the inventive principles and concepts onto an end face of an optical fiber for VCSEL modes LP01, LP11, LP02, LP21 and LP31, respectively. FIGS. 10A-10E show a simulated intensity distribution pattern for a VCSEL light beam coupled by a plastic injection-molded DOE (block 307 of FIG. 3) in accordance with the inventive principles and concepts onto an end face of an optical fiber for VCSEL modes LP01, LP11, LP02, LP21 and LP31, respectively. A comparison of FIGS. 9A-9E with FIGS. 10A-10E shows that the transformed DOE design performs nearly identically to the plastic injection-molded DOE for all five VCSEL modes.

Figure 11C:
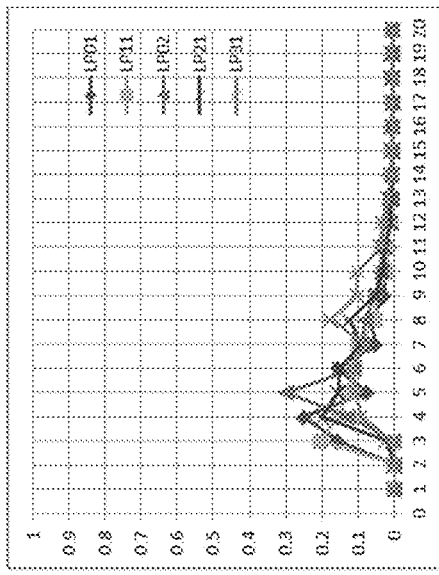
FIGS. 11A, 11B and 11C are graphs showing simulated normalized VCSEL mode group power (vertical axis) as a function of VCSEL mode group (horizontal axis) for laser light coupled onto an end face of an optical fiber by a conventional refractive optical element, by a transformed DOE design and by a plastic injection-molded DOE having the transformed DOE design, respectively.
Figure 11B:
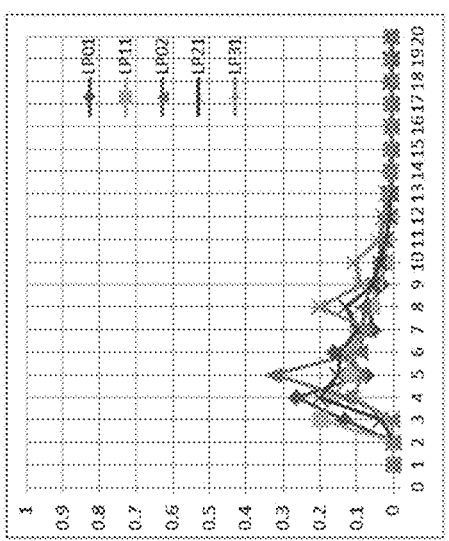
Figure 11A:
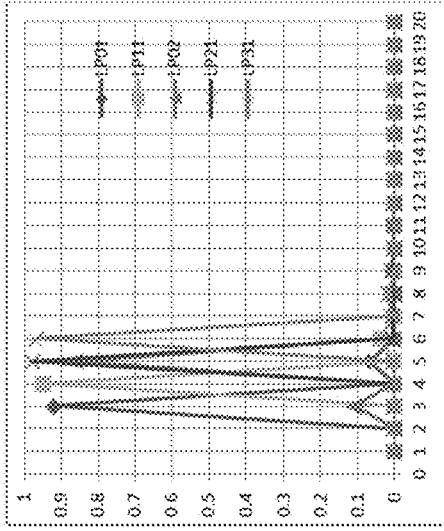

FIGS. 11A, 11B and 11C are graphs showing simulated normalized VCSEL mode group power (vertical axis) vs. VCSEL mode group (horizontal axis) for laser light coupled onto an end face of an optical fiber by a conventional refractive or reflective optical element, by the transformed DOE design (block 305 of FIG. 3) and by the manufactured DOE (block 307 of FIG. 3), respectively. It can be seen in FIG. 11A that when using a conventional refractive or reflective optical element to couple light onto the fiber end face, each VCSEL mode maps to a specific fiber mode. Consequently, mode power exchange will occur, resulting in the generation of mode selective noise (MSN) and/or mode partitioning noise (MPN). On the other hand, it can be seen in FIGS. 11B and 11C that when using the transformed DOE design and the manufactured DOE, respectively, to couple light onto the fiber end face, each VCSEL mode overlaps multiple fiber modes, which mitigates mode power exchange and thereby results in a reduction in MSN. This overlapping of each VCSEL mode with multiple fiber modes is referred to in the art as mode scrambling. The mapping of each VCSEL mode to multiple fiber modes also reduces mode dispersion, thereby reducing MPN. It can be seen by a comparison FIGS. 11B and 11C that the transformed DOE design and the manufactured DOE have comparable performance.

Figure 12:
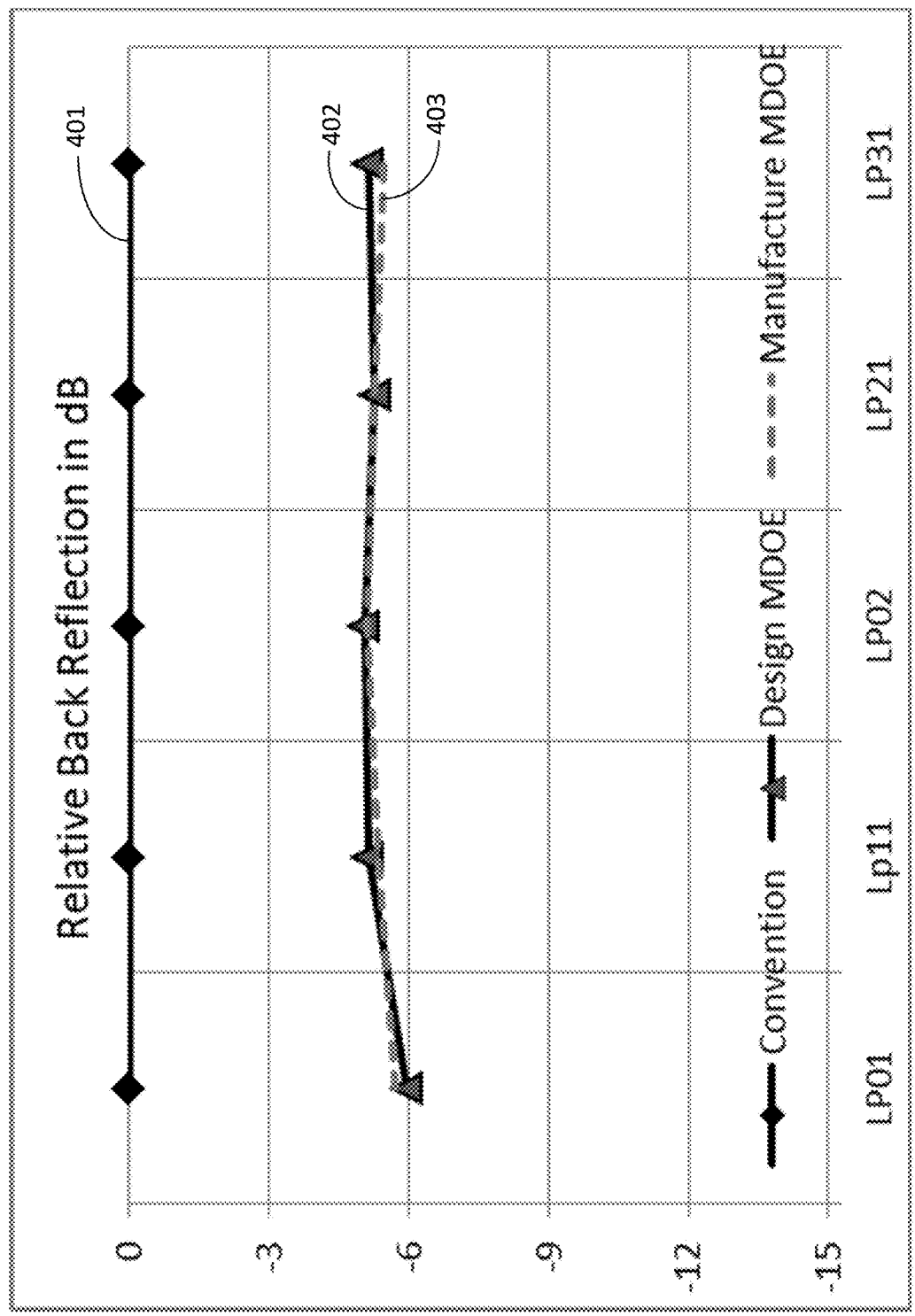
FIG. 12 is a graph showing first, second and third curves representing simulated back reflection in dB when using a conventional refractive or reflective optical coupling system, a transformed DOE design and a plastic injection-molded DOE based on the transformed DOE design, respectively, in accordance with a representative embodiment.

FIG. 12 is a graph showing first, second and third curves 401, 402 and 403, respectively, representing relative back reflection in decibels (dB) from the fiber end face onto the VCSEL that results when using a conventional reflective or refractive optical coupling system, the transformed DOE design and the manufactured DOE, respectively, for the five VCSEL modes LP01, LP11, LP02, LP21 and LP31. A comparison of the curves 401-403 reveals that back reflection resulting from using the conventional optical coupling system to couple light onto the fiber end face is significantly higher than the back reflection that results from using the transformed DOE design or the manufactured DOE. A comparison of the curves 402 and 403 reveals that the transformed DOE design and the manufactured DOE have comparable performance.

Figure 13:
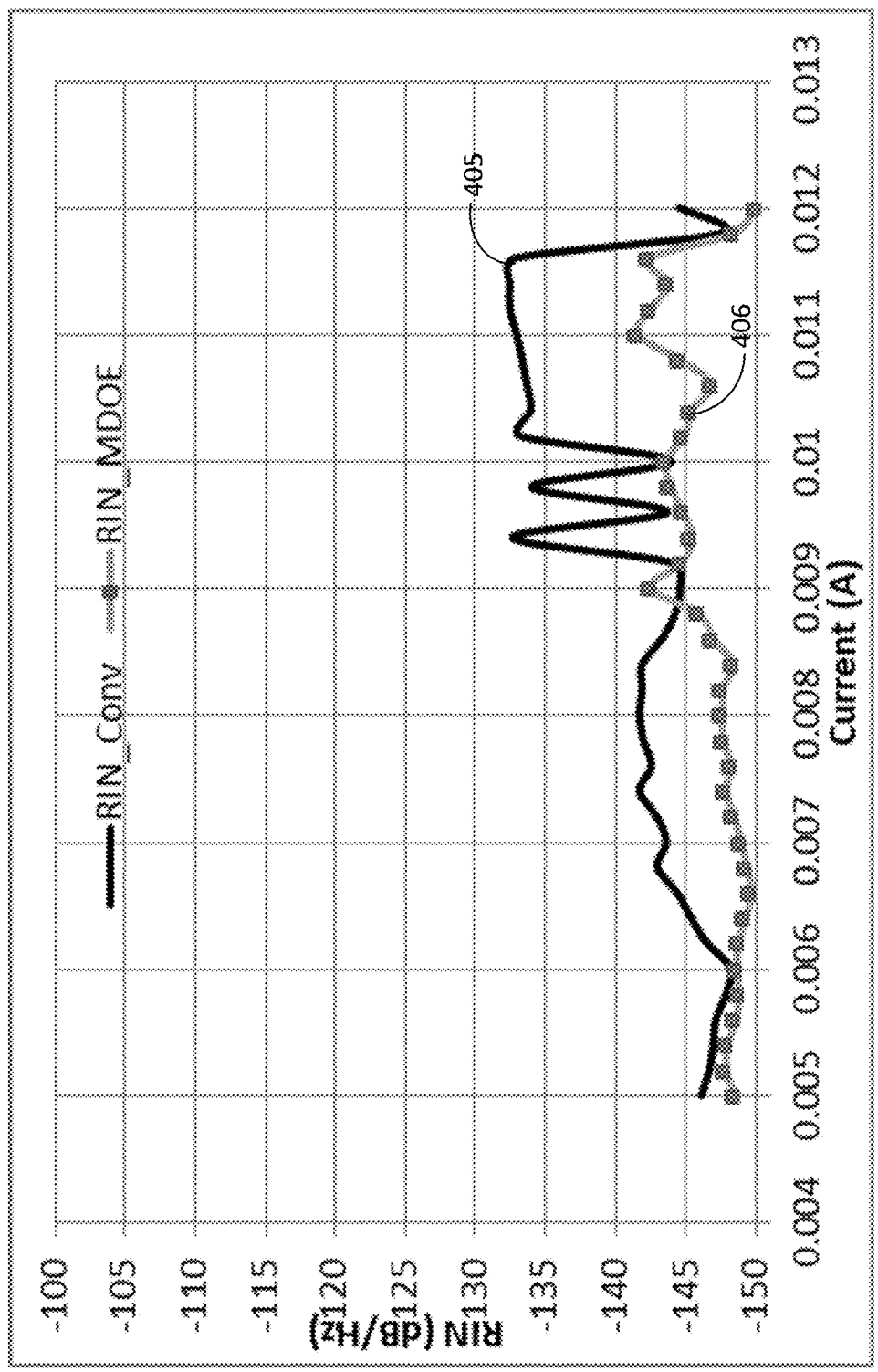
FIG. 13 is a graph showing first and second curves representing measured RIN in dB/Hz for a 100 meter (m) worst-case optical fiber link when using a conventional optical coupling system and the plastic injection-molded DOE in accordance with a representative embodiment, respectively.

FIG. 13 is a graph showing first and second curves 405 and 406, respectively, representing RIN in dB/Hz vs. bias current of the VCSEL for a 100 meter (m) worst-case OM3 optical fiber link when using a conventional optical coupling system and the manufactured DOE, respectively. A comparison of the curves 405 and 406 reveals that RIN that results when using the conventional optical coupling system is usually significantly higher than RIN that results from using the manufactured DOE.

It can be seen from the above description of representative embodiments that transforming a target DOE design into a smoother, more continuous DOE design that is tailored for a particular low-cost, high-quality manufacturing process results in the manufactured DOE retaining many of the precise features of the target DOE design and the corresponding functionalities of the target DOE design. In contrast, without the transformation of the target design (i.e., using the known approach), the manufactured DOE loses many of the fine features that are needed to achieve the corresponding functionalities. Thus, the inventive principles and concepts enable low-cost, high-quality manufacturing processes such as injection molding, for example, to be used to mass produce high-quality freeform DOEs that retain the functionality of the target DOE design at relatively low cost. In addition, the radial asymmetry of the freeform DOE allows it to achieve functions that are not possible with radially symmetric DOEs (e.g., reduced back reflection, mode selection, etc.).

It should be noted that the invention has been described with reference to a few illustrative or representative embodiments for the purposes of demonstrating the inventive principles and concepts. The invention is not limited to these embodiments, as will be understood by persons of ordinary skill in the art in view of the description provided herein. For example, although the representative embodiments have been described with reference to an injection-molded freeform DOE, the DOE may be formed by other processes such as thermal compression and epoxy replication, for example. Similarly, although the representative embodiments have been described with reference to the freeform DOE being made of plastic, the DOE may be made of other suitable materials. Making the DOE of plastic via injection molding allows the DOE to be mass produced with high quality and at low cost, but the inventive principles and concepts are not limited in this regard, as will be understood by those of skill in the art. Those of skill in the art will understand that these and other modifications may be made to the embodiments described herein and that all such modifications are within the scope of the invention.

What is claimed is:

1. An optical transmitter comprising:
   a light source that generates a light beam of an operating wavelength;
   an optical waveguide having at least a first end face; and
   an optical coupling system optically coupled to the light source and to the first end face of the optical waveguide, the optical coupling system including a freeform diffractive optical element (DOE) comprising,
   a DOE material, and
   a preselected freeform diffractive pattern formed in a first surface of the DOE material, the freeform diffractive pattern being radially asymmetric relative to an optical axis of the freeform DOE, the radial asymmetry of the preselected freeform diffractive pattern being dictated, at least in part, by a two-dimensional set of saggita (sag) data.

2. The optical transmitter of claim 1, wherein the first surface having the preselected freeform diffractive pattern formed therein is reflective to an operating wavelength of the freeform DOE.

3. The optical transmitter of claim 1, wherein the first surface is coated with a coating material that is reflective to the operating wavelength of the freeform DOE.

4. The optical transmitter of claim 3, wherein the DOE material is a plastic material.

5. The optical transmitter of claim 1, wherein the DOE material is refractive to an operating wavelength of the freeform DOE.

6. The optical transmitter of claim 5, wherein the DOE material is a plastic material.

7. The optical transmitter of claim 1, wherein the preselected freeform diffractive pattern is preselected to reduce back reflection from the end face of the optical waveguide onto the light source.

8. The optical transmitter of claim 1, wherein the preselected freeform diffractive pattern is preselected to perform mode scrambling by ensuring that at least one linearly polarized (LP) mode of the light source maps to multiple LP modes of the optical waveguide.

9. The optical transmitter of claim 1, wherein the preselected freeform diffractive pattern is preselected to reduce mode selective noise (MSN).

10. The optical transmitter of claim 1, wherein the preselected freeform diffractive pattern is preselected to reduce mode partitioning noise (MPN).

11. The optical transmitter of claim 1, wherein the preselected freeform diffractive pattern is preselected to reduce relative intensity noise (RIN) of the light source.

12. A method of manufacturing the optical coupling system of claim 1, the method comprising:
    simulating launch conditions of the optical coupling system, wherein during the simulations, one or more computer generated holograms (CGHs) are incorporated into the optical coupling system in an attempt to produce simulated launch conditions having a selected target intensity distribution pattern;
    selecting the CGH that was used during the simulation and that produced launch conditions that achieving the selected target intensity distribution pattern;
    designing a target diffractive optical element (DOE) having spatial variations in thickness corresponding to a phase pattern of the selected CGH;

applying a preselected smoothing function to the target DOE design to transform the target DOE design into a transformed DOE design; and fabricating the freeform DOE such that the preselected freeform diffractive pattern formed in the first surface of the DOE material has the transformed DOE design.

13. The method of claim 12, further comprising:

before fabricating the freeform DOE, verifying that the transformed DOE design has comparable performance to the target DOE design.

14. The method of claim 12, wherein the step of fabricating the freeform DOE comprises:

creating a mold master that is configured to mold a DOE having the transformed DOE design; and using a molding process that uses the mold master in combination with a plastic material comprising said DOE material to form the preselected freeform diffractive pattern in the first surface of the DOE material, and wherein the preselected freeform diffractive pattern has the transformed DOE design.

15. The method of claim 14, wherein the step of creating the master comprises:

using diamond turning to create the mold master.

16. The method of claim 14, wherein the molding process is an injection molding process.

17. The method of claim 14, wherein the molding process is a thermal compression molding process.

18. The method of claim 14, wherein the molding process is an epoxy replication molding process.

* * * * *